Feb. 10, 1942.          J. L. STRATTON                 2,272,754
                     ELECTRIC CONTROL CIRCUIT
                       Filed May 20, 1939
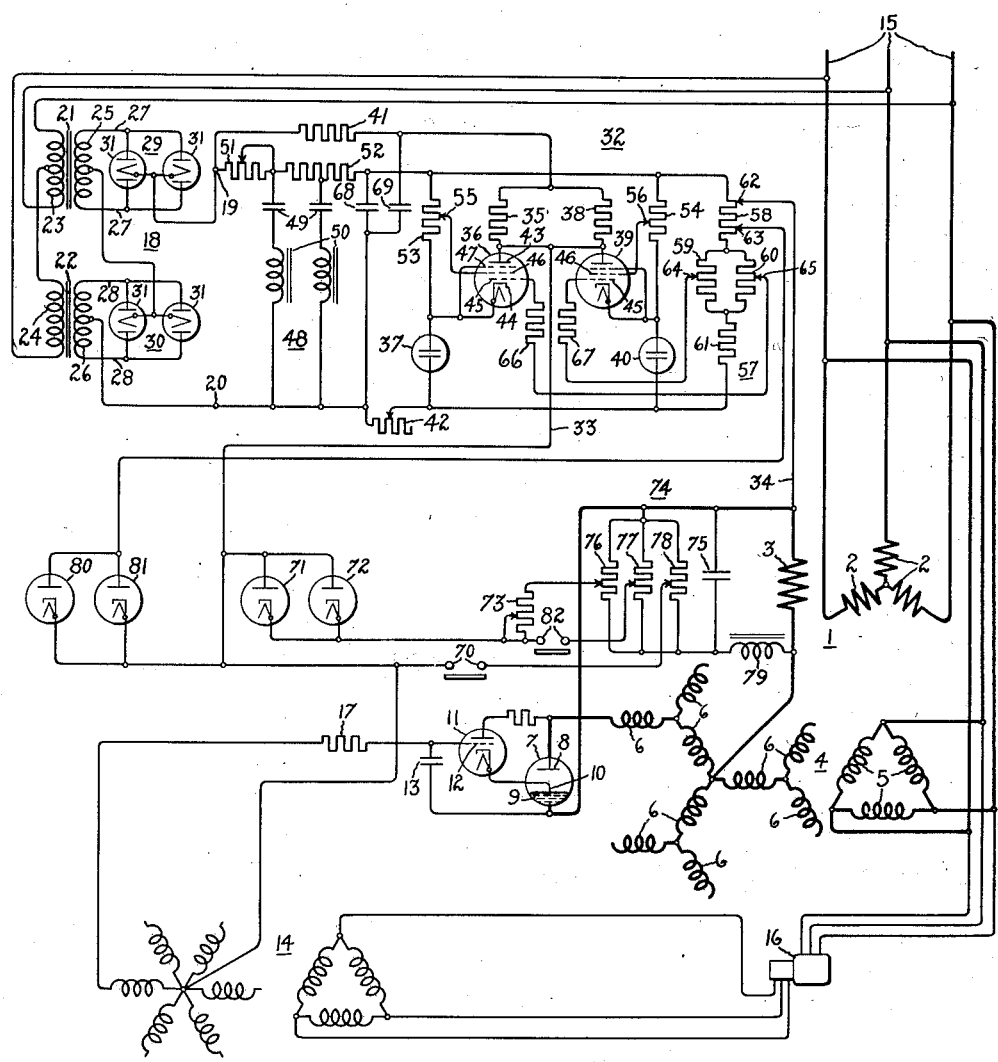
Inventor:
Jerry L. Stratton,
by Harry E. Dunham
         His Attorney.

Patented Feb. 10, 1942

2,272,754

UNITED STATES PATENT OFFICE 2,272,754

ELECTRIC CONTROL CIRCUIT

Jerry L. Stratton, Schenectady, N. Y., assignor to General Electric Company, a corporation of New York Application May 20, 1939, Serial No. 274,765

13 Claims. (Cl. 250—27)

My invention relates to electric control circuits and more particularly control circuits for electric valve apparatus.

It has become apparent that there is a decided need for improved electric control circuits, particularly circuits including electronic apparatus for controlling electrical apparatus such as dynamo-electric machines, and which are capable of maintaining an electrical condition or an operating condition of the apparatus at precisely determinable values. Of course, it is important that the apparatus be capable of functioning in this manner and be susceptible of performing its intended function without requiring frequent repairs or replacements. As an additional matter, it is essential in order to maintain continuity of service that the control system be constructed and arranged to permit temporary failure of one of the important parts without necessitating an interruption of service. In accordance with the teachings of my invention described hereinafter, I provide a new and improved electric valve control system which affords precise and accurate control of an electrical condition and which is arranged to maintain its operation irrespective of the failure of one or more of its important elements.

It is an object of my invention to provide a new and improved electric valve circuit.

It is another object of my invention to provide a new and improved electric valve control circuit for controlling an electrical condition or an operating condition of associated electrical equipment.

It is a further object of my invention to provide a new and improved control circuit energized from the polyphase alternating current circuit for producing a control voltage which varies in accordance with the absolute magnitudes of the sum and the difference of the positive and negative phase sequence components of voltage of the alternating current circuit.

Briefly described, in the illustrated embodiment of my invention I provide a new and improved electric valve control circuit for controlling the operation of a dynamo-electric machine which is connected to an associated polyphase alternating current circuit, such as a three phase alternating current circuit. The control circuit produces a unidirectional voltage which gives an indication for proper regulator response under both balanced and unbalanced voltage conditions in the polyphase machine or circuit being regulated. I also provide an improved electric valve control circuit in which the voltage sensitive or voltage responsive elements are provided in duplicate and are arranged to permit parallel operation thereof, so that in the event of failure of one of the essential elements the operation of the control system is not affected, thereby preserving continuity of service.

For a better understanding of my invention, reference may be had to the following description taken in connection with the accompanying drawing, and its scope will be pointed out in the appended claims. The single figure of the accompanying drawing diagrammatically illustrates an embodiment of my invention as applied to a voltage regulator for a dynamo-electric machine, such as a polyphase alternating current synchronous condenser.

Referring now to the single figure of the accompanying drawing, my invention is there illustrated as applied to a control system for regulating or controlling an electrical condition, such as the voltage, of a dynamo-electric machine 1 which may be a polyphase alternating current generator or synchronous condenser comprising armature windings 2 and a field winding 3. Variable amounts of unidirectional current are transmitted to the field winding 3 by means of a rectifier including a transformer 4 having primary windings 5 and a plurality of secondary windings 6. The rectifier also includes a plurality of power or principal electric valve means 7 associated with the windings 6. For the purpose of simplifying the illustration of my invention, only one electric valve means is shown and it is to be understood that electric valve means are also intended to be connected to the other secondary windings 6. The electric valve means 7 is preferably of the type employing an ionizable medium, such as a gas or a vapor, and includes an anode 8, a cathode 9, such as a self-reconstructing cathode of mercury, and may include a control member 10 of the immersion-ignitor type associated with the cathode 9. The immersion-ignitor control member 10 may be constructed of a suitable material having an electrical resistivity relatively high with respect to that of the associated cathode 9. This material may be boron-carbide, silicon-carbide, or any other similar material.

Each of the electric valve means 7 may be provided with a control electric valve 11. If desired, the control electric valve 11 may be connected to be responsive to the polarity of the anode voltage of the associated principal electric valve. The control electric valve 11 is provided with a grid 12 which controls the conductivity thereof, and this electric valve may also be of the type employing an ionizable medium. A suitable capacitance 13 may be connected between the grid or control member 12 of electric valve 11 and the cathode 9 of electric valve 7 as a means for stabilizing the potential of the control member 12.

I employ a suitable means, such as a transformer 14, for impressing on the control member 12 an alternating component of voltage. The transformer 14 may be energized from the dynamo-electric machine 1, or from an alternating current circuit 15 to which the armature winding 2 is connected, through a suitable phase shifting device, such as a rotary phase shifter 16. The alternating component of voltage is preferably adjusted to lag the applied anode-cathode voltage by substantially 90 electrical degrees. A suitable current limiting resistance 17 may be connected in series relation with the control member 12.

I provide a control circuit 18 which produces across its output terminals 19 and 20 a unidirectional voltage the magnitude of which varies in accordance with the absolute magnitudes of the sum and the difference of positive and negative phase sequence components of an electrical quantity, such as the voltage, of the alternating current circuit 15. More particularly, the circuit 18 supplies a unidirectional control voltage the magnitude of which varies in accordance with the sum of the sum and the difference of the absolute values of the positive and negative phase sequence components of voltage of the alternating current circuit 15. The circuit 18 comprises a Scott-connected transforming means, such as a pair of transformers 21 and 22, having primary windings 23, 24 and secondary windings 25, 26, respectively. The primary windings 23 and 24 are connected in a Scott or T-connection, and the secondary windings 25 and 26 energize a pair of quarter-phase alternating current circuits 27 and 28. Rectifiers 29 and 30, which may be of the bi-phase type, are connected to be energized by the quarter-phase circuits 27 and 28, and the output circuits thereof are connected in series relation. Each of the rectifiers 29 and 30 may comprise a pair of double-anode electronic discharge means 31. The pairs of discharge means 31 are used to minimize the effect of failure, and to permits the system to remain in operation even though one valve in each group fails.

In order to impress on the control members 12 of the control electric valves 11 a variable unidirectional biasing potential, such as a negative unidirectional biasing potential, which varies in magnitude in response to the variations in the potential appearing across output terminals 19 and 20 of circuit 18, I provide circuit 32. Circuit 32 is connected to the control members 12 through conductors 33 and 34 which constitute an interconnecting control circuit. The circuit 32 comprises a pair of parallel electric paths responsive to the magnitude of the voltage appearing across terminals 19 and 20. One of these parallel paths includes a serially connected impedance element, such as a resistance 35, an electronic discharge device 36 and a constant voltage device, such as a glow discharge valve 37. The other parallel electric path includes a resistance 38, an electronic discharge device 39 and a glow discharge valve 40. These parallel paths are connected to terminals 19 and 20 through resistances 41 and 42. The electronic discharge devices 36 and 39 are preferably of the high vacuum type, each having an anode 43, a cathode 44 and a pair of control grids 45 and 46. It is to be understood that these control grids may be the usual control grid and the screen grid of the conventional type electronic discharge device. A third grid, such as a suppressor grid 47, may be connected to the cathode 44. The anodes 43 of electronic discharge devices 36 and 39 are connected together and are connected to the conductor 33. The potential of conductor 33, of course, varies in response to the current conducted by the electronic discharge devices 36 and 39.

To supply a filtered unidirectional voltage to the glow discharge valves 37 and 40, I provide a filter circuit 48 which is connected to terminals 19 and 20 of circuit 18. The filter circuit may include capacitances 49 and inductances 50 and resistances 51 and 52. Suitable impedance elements, such as resistances 53 and 54, are connected between one terminal of the filter circuit 48 and the upper terminal of the glow discharge valves 37 and 40. Resistances 53 and 54 are provided with adjustable contacts 55 and 56, respectively, to impress on the control grids 46 a variable unidirectional voltage which varies in accordance with the output voltage of the filter circuit 48 and which also varies in accordance with the voltage appearing across the terminals 19 and 20.

I provide a voltage divider 57, which includes resistances 58—61, and which is connected to be responsive to the output voltage of the filter circuit 48. Resistance 58 is furnished with adjustable contacts 62 and 63, and resistances 59 and 60 are also provided with adjustable contacts 64 and 65, respectively. Contacts 64 and 65 are connected to control grids 45 of electronic discharge devices 39 and 36, respectively, and impress thereon unidirectional components of voltage the magnitude of which varies in accordance with or in response to the output voltage of circuit 18. Current limiting resistances 66 and 67 may be connected in series relation with the control grids 45.

Capacitances 68 and 69 may be connected between one of the output terminals of the filter circuit 48 and the anode-cathode circuit of electric discharge devices 38 and 39. It is to be noted that by virtue of this connection, including resistances 51 and 52, that a higher voltage is impressed on the parallel electric paths than is impressed across the serially connected resistances 53 and 54 and the glow discharge valves 37 and 40.

During the starting of the machine 1 when it is operating as a motor or as a condenser, it may be necessary or desirable to limit the field current. Frequently, it is important to maintain the field current at a substantially constant value during the starting operation. I employ an arrangement broadly disclosed and claimed in a copending application Serial No. 196,456 of Elmo E. Moyer, filed March 14, 1938, and assigned to the assignee of the present application. I employ a relay, having contacts 70, which causes the direct-current control voltage for the electric valves 11 to be supplied by the field winding 3 instead of being derived from the circuit 32. Due to the fact that the field resistance is considerably lower than that of the circuit 32, and since the field circuit and a portion of circuit 32 are effectively connected in parallel relation, the voltage derived from the field winding 3 when the relay is closed effectively controls the system.

In order to obtain the desired voltage regulation of the machine 1 for loads beyond a predetermined value, I employ a suitable unidirectional conducting means, such as electric valves 71 and 72, and a serially connected resistance 73. These electric valves prevent the field voltage from coming into effect until the full-load point is reached. After the load exceeds a predetermined value, the voltage control or regulation of the machine is modified by the field voltage. As a means for deriving a control voltage which is representative of the load imposed on the machine 1, I employ a circuit 74 including a capacitance 75 and a plurality of resistances 76, 77 and 78 which are connected across the terminals of the field winding 3 through a smoothing inductance 79.

As an agency for obtaining proper inverter action of the electric valves 7 in the event the circuit 32 dictates a decrease in the energization of the field winding 3 under varying load conditions, the value of the negative unidirectional component of voltage impressed on control members 12 of the control electric valves 11 is limited by suitable unidirectional conducting means, such as electric valves 80 and 81. To minimize the effect of electric valve failure, two of these electric valves may be connected in parallel relation. To prevent overheating of the field winding 3 of machine 1, it is necessary to limit the field current to some particular value. This is done by closing contacts 82 of a relay which applies the field voltage through electric valves 71 and 72 and shunts the resistance 73. In other words, when the relay contacts 82 are closed, the component of voltage derived from the field winding 3 is increased to limit the maximum average value of current transmitted by the power electric valve 7.

The operation of the embodiment of my invention shown in the single figure of the drawing will be explained by considering the system when the dynamo-electric machine 1 is operating as a synchronous condenser to transmit variable amounts of reactive kilovolt-amperes to the alternating current circuit 15. Generally speaking, the average value of the unidirectional current transmitted to the field winding 3 is determined by the time during the cycles of applied anode-cathode voltage when the electric valves 11 and power electric valves 7 are rendered conductive. As the times of initiation of the arc discharge devices are advanced towards the beginning of the positive half cycles of voltage the average current is increased; and conversely as these times are retarded the average current is decreased. The control electric valves 11 transmit unidirectional current to the immersion-ignitor control members 10 at the desired time to initiate arc discharges in the electric valve means 7.

Control circuits 18 and 32 operate to control the magnitude of the resultant negative unidirectional biasing potential impressed on the control members 12 of the control electric valve 11 to regulate the value of the current transmitted to field winding 3. The rotary phase shifter 16 is preferably adjusted so that the alternating components of voltage impressed on the control members 12 lag the anode-cathode voltage by substantially 90 electrical degrees, and the conductivities of the control electric valves 11 are determined by the variation in the magnitude of the unidirectional voltage derived from circuit 32.

Control circuit 32 determines the voltage difference between conductors 33 and 34, and, of course, determines the variation in the magnitude of the negative unidirectional biasing potential impressed on control members 12 of control electric valves 11. The conductivities of the electronic discharge devices 36 and 39 are adjusted by means of contacts 64 and 65 of voltage divider 57 to obtain the desired balance in the currents conducted by the two parallel electric paths including resistances 35, 38, electronic discharge devices 36, 39, and glow discharge valves 37 and 40, respectively. Contacts 55 and 56 are also adjusted to control the voltages impressed on control grids 46 so that the two paths operate in parallel. The magnitude of the negative unidirectional biasing potential or the potential difference between conductors 33 and 34 is determined by the magnitude of the current conducted by electronic discharge devices 36 and 39. As the voltage of the alternating current circuit 15 varies, the magnitude of the potential difference between conductors 33 and 34 also varies. For example, if the voltage of the alternating current circuit 15 increases, the voltage difference between terminals 19 and 20 of circuit 18 also increases and the electronic discharge devices 36 and 39 conduct a larger amount of current. This increase of current produces a larger voltage drop across resistances 35 and 38 and hence increases the negative unidirectional biasing potential impressed on control grids 12, causing the control electric valves 11 to be rendered conductive at later times during the positive half cycles of applied anode-cathode voltage and consequently reduce the average value of the direct current transmitted to the field winding 3. As a result, the voltage of the circuit 15 will be restored to the desired value. Conversely, if the voltage of the alternating current circuit 15 decreases, the magnitude of the negative unidirectional biasing potential impressed on control members 12 will be decreased and the average value of the direct current transmitted to field winding 3 will be increased, thereby raising the voltage of circuit 15 to the desired value.

The manner in which the conductivity of the electronic discharge devices 36 and 39 is controlled may be explained as follows: Considering electronic discharge device 36 in particular, the resistance 55 and glow discharge valve 37 may be considered as constituting one branch of a voltage responsive bridge, and the voltage divider 57 may be considered as the other branch. These two branches conjointly control the conductivity of electronic discharge device 36 by controlling the potentials impressed on control grids 46 and 45, respectively. In like manner, the conductivity of the electronic discharge device 39 is controlled by a voltage responsive bridge including two branches, one of which is the resistance 54 and the glow discharge valve 40, and the other of which is the voltage divider 57. Due to the fact that the essential elements of the circuit 32, namely the resistance, the electronic discharge device and the glow discharge valve, are provided in duplicate, the circuit 32 may operate without interruption if one or the other of the parallel electric paths becomes inoperative, thereby preserving continuity of service.

Circuit 18 operates to control the magnitude of the unidirectional voltage appearing between terminals 19 and 20 in accordance with the sum of the sum and the difference of the positive and negative phase sequence components of the voltage of the polyphase alternating current circuit 15. Inasmuch as the rectifiers 29 and 30 are connected in series relation with respect to each other, the system indicates the sum of the absolute magnitudes of the sum and the difference of the positive and negative phase sequence voltages. If the positive phase sequence voltage be represented as $e_1$, and the negative phase sequence component be represented as $e_2$, the system provides a direct current voltage $e_{dc}$, defined hereinafter. To determine the magnitude of the unidirectional voltage $e_{dc}$, the vector sum of the positive and negative phase sequence components is derived, the vector difference of the positive and the negative phase sequence components is derived, and the sum of the absolute values of the aforesaid sum and difference are added.

$$e_{dc} = \tfrac{1}{2}\{|e_\alpha| + |e_\beta|\}$$
$$e_{dc} = \tfrac{1}{2}\{|e_1 + e_2| + |e_1 - e_2|\}$$

where $e_\alpha$ and $e_\beta$ represent the alternating quarter phase voltages of windings 25 and 26.

An important aspect of my invention discussed above concerns the feature which permits parallel operation of the glow discharge valves 37 and 39 which are both connected in parallel across the output circuit of the filter circuit 48 through resistances 53 and 54, respectively. It is understood that due to slight variations in the structure of individual glow discharge valves due to manufacturing inaccuracies, it is difficult to obtain two glow discharge valves which maintain across the terminals the same voltage drop. The arrangement discussed above, particularly circuit 32, makes it possible to operate two or more glow discharge valves in parallel relation energized from the same source. The adjustable contacts 64 and 65 control the conductivities of the electronic discharge devices 36 and 39 so that the voltage drop appearing across glow discharge valves 37 and 40 may be maintained at the same value.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, a three phase alternating current circuit, a Scott-connected transforming means connected to said circuit, a pair of quarter-phase alternating current circuits energized from said transforming means, a pair of serially connected rectifiers each connected to a different one of said quarter-phase circuits, a pair of parallel electric paths connected to said rectifiers and each including a serially connected impedance element, an electronic discharge device and a glow discharge valve, the electronic discharge devices each having a control grid for controlling the conductivity thereof, a voltage divider for impressing on the control grids voltages which vary as the output voltage of said rectifiers, and a circuit connected between said parallel paths and said voltage divider.

2. In combination, a source of variable unidirectional voltage having positive and negative terminals, an output circuit, means for impressing on said output circuit a unidirectional voltage which varies in accordance with the voltage of said source and comprising a pair of electric paths connected to said source and each including a serially connected impedance element, an electronic discharge device and a glow discharge device, the electronic discharge devices each having a control grid for controlling the conductivity thereof, means connected across said terminals for impressing on the control grids voltages which vary as the voltage of said source, and means for controlling the relative magnitudes of the voltages impressed on said control grids to cause said pair of electric paths to operate in parallel.

3. In combination, a source of variable unidirectional voltage, an output circuit, means for impressing on said output circuit a voltage which varies in accordance with the voltage of said source including a pair of electric circuits connected to said source and each comprising a serially connected impedance element, an electronic discharge device and a glow discharge device, the electronic discharge devices each having a control grid for controlling the current conducted thereby, a voltage divider energized in response to the voltage of said source for impressing control voltages on the grids, and means for adjusting the relative magnitudes of the voltages impressed on said control grids to cause said pair of electric circuits to operate in parallel.

4. In combination, a source of variable unidirectional voltage, a pair of electric circuits connected to said source and each comprising in series relation an impedance element, an electronic discharge device and a glow discharge valve, the electronic discharge devices each having a control grid, a voltage divider for impressing voltages on the control grids which vary in response to the voltage of said source and comprising means for controlling the relative magnitudes of the voltages impressed on said control grids to cause said pair of electric circuits to operate in parallel, and a control circuit connected between said parallel paths and said voltage divider.

5. In combination, a source of variable unidirectional voltage, a pair of parallel electric paths each comprising in series relation an impedance element, an electronic discharge device and a glow discharge valve, the discharge devices each being provided with a pair of control grids, means comprising a voltage divider responsive to the voltage of said source for impressing on corresponding control grids of said discharge devices unidirectional voltages which vary as the voltage of said source, resistances connected between one terminal of said source and the glow discharge valves for impressing upon other corresponding control grids a predetermined component of the variation in the voltagte of said source, and a circuit connected between the electric paths and said voltage divider.

6. In combination, a polyphase alternating current circuit, and means for producing a unidirectional voltage which varies in accordance with the positive and negative phase sequence components of an electrical quantity of said alternating current circuit under unbalanced electrical conditions of the phases of said polyphase alternating current circuit and comprising a Scott-connected transforming means for providing a pair of quarter phase alternating current circuits and a pair of serially connected rectifiers each energized from a different one of said quarter phase circuits.

7. In combination, a polyphase alternating current circuit, a second circuit, and means for impressing on said second circuit a unidirectional voltage the magnitude of which varies in accordance with the sum of the sum and the difference of the positive and negative phase sequence components of voltage of said alternating current circuit under unbalanced electrical conditions of the phases of said polyphase alternating current circuit and comprising a Scott-connected transforming means, a pair of quarter phase alternating current circuits energized from said transforming means and a pair of serially connected rectifiers each energized from a different one of said quarter phase circuits.

8. In combination, a three phase alternating current circuit, a second circuit, and means for impressing on said second circuit a unidirectional voltage the magnitude of which varies in accordance with the sum of the sum and the difference of the positive and negative phase sequence components of voltage of said alternating current circuit and comprising a pair of transformers having primary windings connected in a Scott-connection and each having a secondary winding, a pair of quarter phase alternating current circuits each energized from a different one of said secondary windings and a pair of rectifiers each connected to a different one of said quarter phase circuits and having output circuits connected in series relation.

9. In combination, a source of variable unidirectional voltage, a pair of electric paths connected to said source and each including in series relation an impedance element, an electronic discharge device and a glow discharge valve, the electronic discharge devices each having a control grid, a filter circuit connected to said source, means connected to said filter circuit for impressing on the control grids voltages which vary in accordance with the voltage of said source, means for controlling the relative magnitudes of the voltages impressed on the control grids to cause said electric paths to operate in parallel, and a circuit having a terminal thereof connected to said electric paths.

10. In combination, a source of variable unidirectional voltage, a pair of electric paths connected to said source and each including in series relation an impedance element, an electronic discharge device and a glow discharge valve, said electronic discharge devices each having a control grid, a filter circuit connected to said source, a voltage divider connected to said filter circuit for impressing on the control grids voltages which vary in accordance with the voltage of said source, means for controlling the relative magnitudes of the voltages impressed on the control grids to cause said electric paths to operate in parallel, and a circuit connected between the parallel paths and said voltage divider.

11. In combination, a source of current, a pair of electric paths each including a serially-connected impedance element, an electronic discharge device and a glow discharge valve, each of said electronic discharge devices having a control grid, a pair of resistances each connected between one terminal of said source and one of said glow discharge valves, means for controlling the relative magnitudes of the voltages impressed on the control grids to cause said electric paths to operate in parallel, and means for energizing the control grids to obtain a predetermined relation between the values of the currents transmitted through said glow discharge valves.

12. In combination, a source of current, a pair of glow discharge devices, and means for transmitting current simultaneously through said devices from said source including a pair of electric paths, each including a serially-connected impedance element, an electronic discharge device and one of said glow discharge devices, said electronic discharge devices each having a control grid, and means for impressing voltages on the grids to cause said paths to operate in parallel and to control the currents in said paths.

13. In combination, a source of current, a pair of glow discharge devices, and means for transmitting current simultaneously through said devices from said source including a pair of electric paths each including a serially-connected impedance element, an electronic discharge device and one of said glow discharge devices, said electronic discharge devices each having a control grid and a voltage divider connected across said source for impressing voltage on the grids to cause said pair of electric paths to operate in parallel and to control the currents in said paths.

JERRY L. STRATTON.